United States Patent
Kaizu

(10) Patent No.: US 7,750,676 B2
(45) Date of Patent: Jul. 6, 2010

(54) EMBEDDED SYSTEM AND CONTROL METHOD THEREFOR

(75) Inventor: Tetsuya Kaizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/964,558

(22) Filed: Dec. 26, 2007

(65) Prior Publication Data
US 2008/0258758 A1     Oct. 23, 2008

(30) Foreign Application Priority Data
Dec. 28, 2006   (JP) .............................. 2006-356475

(51) Int. Cl.
*H01L 25/00*     (2006.01)
*H03K 19/173*    (2006.01)

(52) U.S. Cl. .............................. 326/47; 326/38; 326/10; 711/103; 711/170

(58) Field of Classification Search ............. 326/37–41, 326/47, 10; 711/103
See application file for complete search history.

(56) References Cited

U.S. PATENT DOCUMENTS

| 6,067,615 | A  | * | 5/2000 | Upton ......................... 712/37 |
| 6,538,468 | B1 | * | 3/2003 | Moore ......................... 326/40 |
| 7,095,247 | B1 | * | 8/2006 | Tang et al. .................... 326/38 |

FOREIGN PATENT DOCUMENTS

JP     2000-311945     11/2000

* cited by examiner

*Primary Examiner*—Rexford N Barnie
*Assistant Examiner*—Jany Tran
(74) *Attorney, Agent, or Firm*—Staas & Halsey LLP

(57) ABSTRACT

An embedded system having a programmable logic circuit, a plurality of storage devices each storing configuration data defining circuit information of the logic circuit, a setting information storage storing setting information including information of a storage device storing the configuration data and a controller selecting one of the plurality of storage devices based on the setting information and incorporating circuit information defined by configuration data stored in the selected storage device into the logic circuit.

12 Claims, 8 Drawing Sheets

FIG.3

| FLASH MEMORY IDENTIFICATION INFORMATION | CURRENT SYSTEM FLAG | BACKUP SYSTEM FLAG |
|---|---|---|
| F0001 | ON | OFF |
| F0002 | OFF | ON |

SETTING INFORMATION

EMBEDDED SYSTEM AND CONTROL METHOD THEREFOR

CROSS-REFERENCE TO RELATED APPLICATIONS

This application is related to and claims the benefit of priority from Japanese Patent Application No. 2006-356475, filed on Dec. 28, 2006, the entire contents of which are incorporated herein by reference.

BACKGROUND

1. Field

The present invention relates to an embedded system that stores configuration data used for a logic circuit device such as FPGA (Field Programmable Gate Array) and PLD (Programmable Logic Device) having an internal circuit that is programmable in an external storage, and incorporates the configuration data stored in the external storage into the logic circuit and a control method therefore.

Particularly, the present invention relates to an embedded system that minimizes a down time by appropriately avoiding problems caused by hardware/software errors occurring in an FPGA or the like and a control method therefore.

2. Description of the Related Art

In recent years, embedded systems having firmware that can be updated from a remote location have been widely used.

Here, the firmware is software incorporated in an equipment to perform basic control of firmware/hardware and includes, for example, a real-time operating system (OS).

FIG. 7 is a schematic diagram for illustrating a firmware update system having a typical embedded system.

The firmware update system in FIG. 7 comprises an embedded system 50, a service processor 60, and a maintenance center server 70. The embedded system 50 is connected to the service processor 60 via a network (not shown) and the service processor 60 is connected to the maintenance center server 70 via a network.

Here, the maintenance center server 70 is a device that outputs to the service processor 60 firmware whose source of causing a hardware/software error has been fixed (hereinafter called fixed firmware) periodically or after the hardware/software error occurs in the embedded system 50.

The service processor 60 is a device that monitors a hardware/software error of the embedded system 50 and, when an error occurs in the embedded system 50, automatically notifies the maintenance center server 70 of the error.

Then, when a fixed firmware is acquired from the maintenance center server 70, the service processor 60 stores the fixed firmware in a storage device 61 to enable application of the fixed firmware to the embedded system 50. The storage device 61 is a storage device for storing fixed firmware and the like.

The embedded system 50 is a system that performs various kinds of processing using the fixed firmware applied by the service processor 60.

The configuration of the embedded system 50 will be described using FIG. 7. The embedded system 50 is constructed by connecting a flash memory 51, a microprocessor 52, FPGA 53, a configuration ROM (C-ROM) 54, a main memory 55, and a network interface 56 using a bus 57.

The flash memory 51 is a kind of a non-volatile memory whose data can be rewritten and has a boot up program area, a control area, a first program area, and a second program area.

The boot up program area is an area where a boot up program is stored in the flash memory 51 and the control area is an area where various kinds of control information of programs stored in the first program area and the second program area are stored in the flash memory 51.

The first program area and the second program area are areas where various kinds of programs (programs corresponding to the above-discussed fixed firmware) are stored.

A program stored in the first program area will be denoted as a "first program" and a program stored in the second program area will be denoted as a "second program" below.

Here, the data structure of the control area will be described. FIG. 8 is a diagram illustrating a data structure of the control area. As shown in FIG. 8, the control area has a plurality of areas ranging from the first generation to the n-th generation (n is an integer equal to 2 or greater) and each control area has a valid/invalid flag, an operating version number, program area information, switching factors, and switching dates/times.

The valid/invalid flag is a flag indicating whether or not information in the corresponding control area is valid. If, for example, the valid/invalid flag of the control area (first generation) is valid, information stored in the control area (first generation) is "valid." The valid/invalid flag of a control area storing old control information is set to "invalid."

The operating version number shows information of a program version number of a program stored in the first program area or second program area. The program area information is information of a boot-up area of a control program, that is, information showing which of the first program and the second program to boot up.

The switching factors are factors when programs were switched, that is, information regarding which factor caused programs to switch, and the switching dates/times are information regarding dates/times when programs were switched.

Returning to the description of FIG. 7, the microprocessor 52 is a means for controlling the embedded system 50 by a first program or a second program read by the main memory 55 from the flash memory 51.

Based on program area information (See FIG. 8) of the flash memory 51, the microprocessor 52 selects the first program or the second program and uses the selected program to control the embedded system 50.

Moreover, the microprocessor 52 refers to the flash memory 51 when updating firmware (when fixed firmware is received from the service processor) and searches for control information (information stored in the control area) for which a valid flag is set.

Then, based on program area information of the control information, an area into which an update program should be written is determined.

If, for example, the first program area is an area of the current system (where the first program is used for various control operations) and the second program area is an area of the backup system (the second program is not used), the microprocessor 52 writes the update program into the second program area.

Then, the written update program is used by a firmware reset (self reset) in which a reset routine is executed by the firmware for rebooting.

The FPGA 53 is a means for controlling the main memory 55, the flash memory 51 and the like in accordance with a control signal from the microprocessor 52 and is a programmable logic circuit such as a FPGA and a programmable logic device (PLD). The C-ROM 54 is a means for storing programs used by the FPGA 53.

The main memory 55 is a means for storing various kinds of information and comprises SDRAM (Synchronous Dynamic Random Access Memory) or normal DRAM (Dynamic Random Access Memory). The network interface 56 is a means for communicating mainly with the service processor 60 using a predetermined communication protocol.

As described above, the typical embedded system 50 is started up by selecting an optimal control program from a plurality of control programs (such as the first program and second program) stored in the flash memory 51 and also writes an update program, which is a fixed firmware, into a program area to be a backup system to update the firmware.

Therefore, while it becomes possible to relatively reduce the time required to solve a problem and reduce the number of operation processes to apply fixed firmware, there exists a problem because the aforementioned embedded system 50 can update only control programs and cannot update configuration data of the FPGA 53 stored in the C-ROM 54.

Thus, when an error occurs in a logic circuit of the FPGA or a boot up program, hardware of the embedded system 50 must directly be replaced, thereby causing problems including requiring a longer time for troubleshooting.

SUMMARY

The present invention has been developed to solve problems existing in conventional technologies. The disclosed embedded system and method enables continuation of operation(s) by sidestepping an error when the error occurs in the embedded system having an FPGA and a control method therefore.

The disclosed system includes a plurality of storage devices each storing configuration data defining circuit information of a logic circuit, a setting information storage storing setting information including information indicating a storage device storing each configuration data, and a controller selecting one of the plurality of storage devices based on the setting information and incorporating circuit information defined by configuration data stored in the storage device selected into the logic circuit.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 is a diagram illustrating a data structure of setting information;

DETAILED DESCRIPTION OF THE PREFERRED EMBODIMENTS

Although a few embodiments have been shown and described, it would be appreciated by those skilled in the art that changes may be made in these embodiments without departing from the principles and spirit of the invention, the scope of which is defined in the claims and their equivalents.

First, an overview and features of the disclosed embedded system will be provided.

The disclosed embedded system is a system related to a device that stores configuration data of an internal circuit used for an FPGA in a plurality of storage devices and incorporates configuration data stored in the storage devices into the FPGA.

The disclosed embedded system may also store, separate or independent from the storage device storing the configuration data, setting information including information pertaining to a storage device for storing configuration data to be incorporated into the FPGA in the storage device.

Then, based on the setting information stored in the storage device, a storage device is selected and configuration data stored in the selected storage device is incorporated into the FPGA.

When updated configuration data is acquired from an external device, the disclosed embedded system may also update old or existing configuration data that has been stored in the storage device by replacing the configuration data with the acquired configuration data and newly incorporate the updated configuration data into the FPGA.

As described above, the disclosed embedded system stores setting information in a storage device different from a storage device in which configuration data is stored and, based on the setting information, selects a storage device in which configuration data to be incorporated into the FPGA is stored.

Then, the configuration data stored in the selected storage device is read and incorporated into the FPGA and therefore, updated configuration data can efficiently be incorporated into the FPGA.

When updated configuration data is acquired, the disclosed embedded updates old or existing configuration data that has been stored in the storage device by replacing the same with the acquired configuration data and incorporates newly updated configuration data into the FPGA.

That is, even if the embedded system does not hold a plurality of pieces of configuration data to be incorporated into the FPGA in advance, countermeasures for the FPGA can appropriately be taken.

Figure 1:
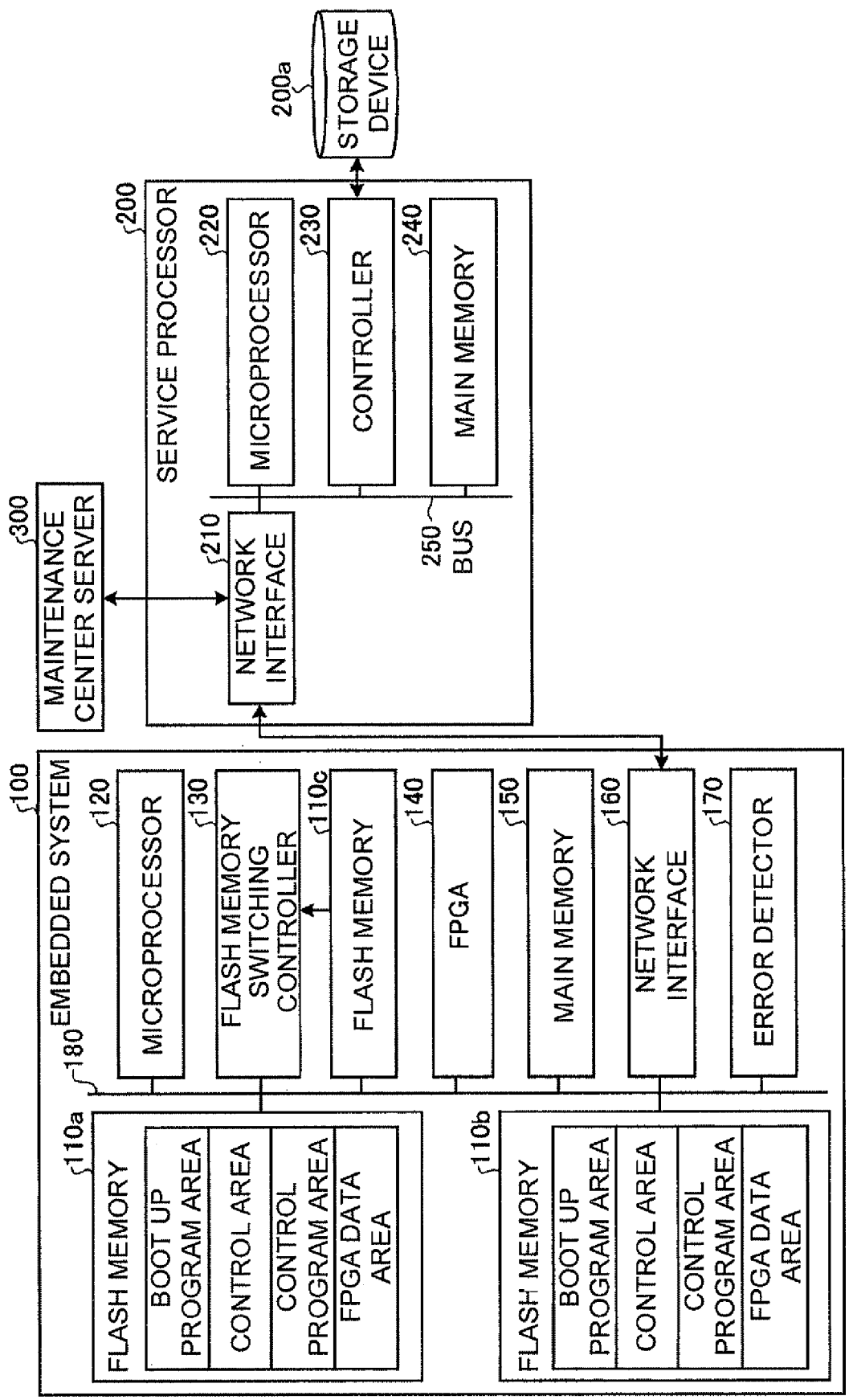
FIG. 1 is a diagram illustrating a configuration of an update system.

Next, an update system including the disclosed embedded system will be described. FIG. 1 is a diagram illustrating a configuration of an update system (device) according to the present embodiment.

As shown in FIG. 1, the update system (device) comprises an embedded system 100, a service processor 200, and a maintenance center server 300.

Here, the maintenance center server 300 periodically outputs or transmits to the service processor 200 update configuration data in accordance with content of an error, or when the error occurs in the embedded system 100.

That is, the maintenance center server 300 outputs to the service processor 200 various programs updated periodically when an error occurs in a boot up program, a control program, or configuration data of the embedded system 100, and update data of the boot up program, the control program, or the configuration data.

The service processor 200 is a device that always monitors for any error of the embedded system 100 and, when an error occurs in the embedded system 100, outputs content of the error to the maintenance center server 300.

Here, the configuration of the service processor 200 will be described. As shown in FIG. 1, the service processor 200 is configured by connecting a network interface 210, a microprocessor 220, a controller 230, and a main memory 240 using a bus 250.

The network interface 210 enables data connection (communication) using a predetermined communication protocol. The network interface 210 performs data communication mainly between the embedded system 100 and the maintenance center server 300.

The microprocessor 220 has an internal memory for storing programs specifying various processing procedures and control data and controls performance of various processing using such programs and data.

The controller 230 enables continuous monitoring of any error pertaining to the embedded system 100 and outputting content of an error to the maintenance center server 300 when the error occurs in the embedded system 100.

When an error that occurs in the embedded system 100 is an error of configuration data, the controller 230 outputs information including information indicating that an error has occurred in the configuration data to the maintenance center server 300.

When an error that has occurred in the embedded system 100 is an error of a boot up program, the controller 230 also outputs information indicating that an error has occurred in a boot up program to the maintenance center server 300. When an error that has occurred in the embedded system 100 is an error of a control program, the controller 230 also outputs information indicating that an error has occurred in a control program to the maintenance center server 300. Here, the control program may include firmware.

Then, when update data is acquired from the maintenance center server 300, the controller 230 stores the acquired update data in a storage device 200*a* before applying the update data to the embedded system 100. The storage device 200*a* enables storage of data including update data.

The main memory 240 enables storing of data and programs required for various processing by the microprocessor 220.

Configuration of the embedded system 100 is described below in further detail.

As shown in FIG. 1, the embedded system 100 is configured by connecting flash memories 110*a* to 110*c*, a microprocessor 120, a flash memory switching controller 130, an FPGA 140, a main memory 150, a network interface 160, and an error detector 170 using a bus 180.

The flash memories 110*a* and 110*b* enables storing of various kinds of data and include a boot up program area, a control area, a control program area, and an FPGA data area.

The boot up program is an area where a boot up program is stored, and the control area is an area where various control information of programs stored in the control program area and FPGA data area is stored.

The control program area is an area where firmware maybe stored. The FPGA data area is an area where configuration data to be incorporated into the FPGA 140 is stored. Data structure of the control area will be described below in further detail.

Figure 2:
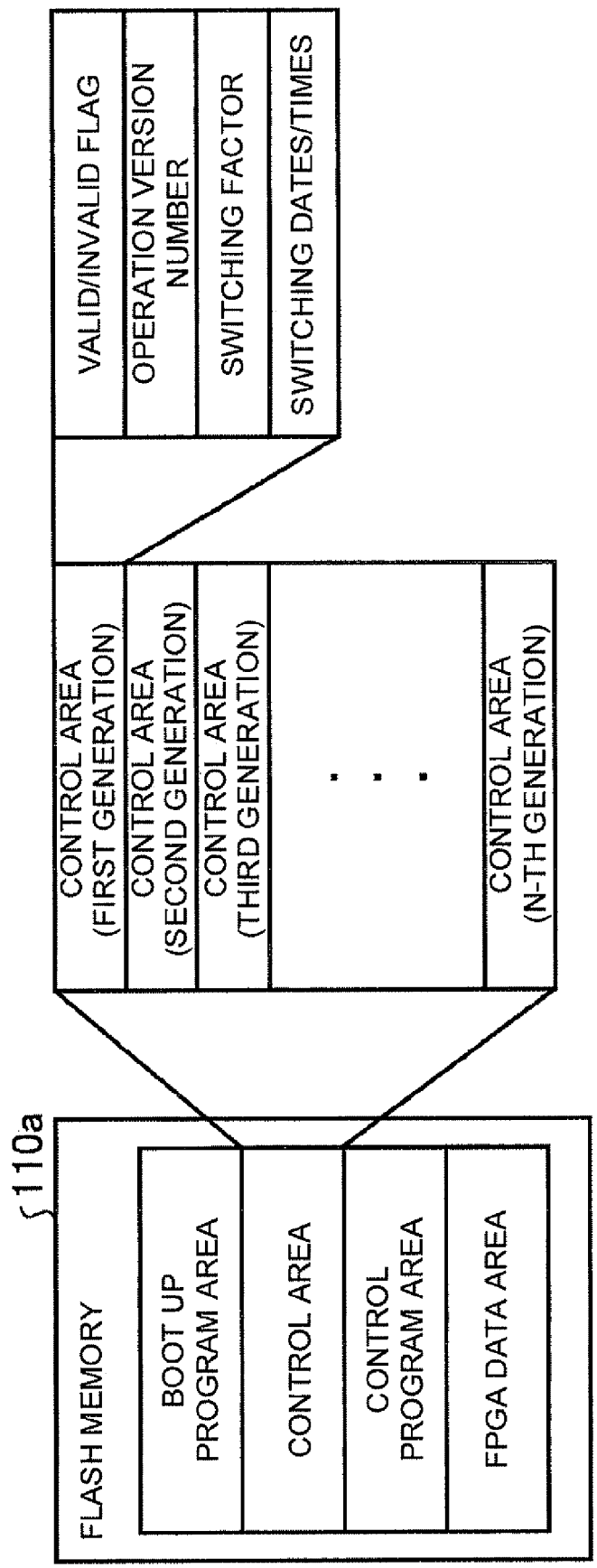
FIG. 2 is a diagram illustrating a data structure of a control area.

FIG. 2 is a diagram illustrating a data structure of a control area according to the present embodiment. As shown in FIG. 2, the control area has a plurality of control areas ranging from a first generation to a n-th generation (n is an integer equal to 2 or greater) and each control area has a valid/invalid flag, an operating version number, switching factors, and switching dates/times.

The valid/invalid flag contains information indicating whether or not information in the corresponding control area is valid.

If, for example, the valid/invalid flag of the control area (first generation) is valid, information stored in the control area (first generation) is valid. The valid/invalid flag of a control area storing old or outdated control information is set to invalid.

The operating version number indicates information of the program version number of a firmware stored in the control program area and the FPGA data area and a boot up program and configuration data stored in the boot up program area.

The switching factors are information storing factors when programs were switched, and the switching dates/times are information storing information regarding dates/times when programs were switched.

Returning to the description of FIG. 1, the flash memory 110*c* enables storing of setting information of flash memories used for boot-up of the embedded system 100.

FIG. 3 is a diagram illustrating a data structure of setting information. As shown in FIG. 3, the setting information has flash memory identification information, a current system flag, and a backup system flag.

The flash memory identification information identifies each flash memory. For example, "F0001" corresponds to the flash memory 110*a* and "F0002" corresponds to the flash memory 110*b*.

The current system flag is a flag indicating a flash memory set in relation to a current system. That is, the flash memory whose current system flag is ON will be the flash memory of the current system. In the example shown in FIG. 3, the flash memory 110*a* of the flash memory identification information "F0001" is the flash memory of the current system.

The embedded system 100 reads configuration data from the flash memory whose current system flag is ON during boot-up to incorporate the configuration data into the FPGA 140 and also reads a boot up program and a control program from the flash memory to execute startup.

Here, the control program may include firmware.

The backup system flag is a flag indicating a flash memory, set to be a backup system. More specifically, the flash memory whose backup system flag is ON will be the flash memory of the backup system. In the example shown in FIG. 3, the flash memory 110*b* of the flash memory identification information "F0002" is the flash memory of the backup system.

Various updated data (the boot up program, control program, configuration data, etc) is written into the flash memory of the backup system.

The microprocessor 120 has an instruction cache for storing instructions of programs specifying various processing procedures, a data cache for storing data, and a computing unit for performing data operations based on instructions, and enables performing of processing.

The flash memory switching controller 130 enables reading of setting information stored in the flash memory 110*c* and switching the flash memory of the current system and that of the backup system based on the read setting information.

If, for example, setting information is set as shown in FIG. 3, the flash memory switching controller 130 switches the flash memory 110a to the current system.

The microprocessor 120 reads the boot up program and control program stored in the flash memory of the current system into the main memory 150 and executes the read boot up program and control program to start up the embedded system 100.

The FPGA 140 enables controlling of the main memory 150, the flash memories 110a to 110c and the like in accordance with a control signal from the microprocessor 120 and has an internal circuit, which includes programmable semiconductor logic circuit devices.

For example, PLD may be used instead of FPGA as the semiconductor logic circuit devices. The FPGA 140 reads configuration data from the flash memory switched to the current system by the flash memory switching controller 130 and incorporates the read configuration data before performing processing. While examples using an FPGA and PLD are provided, the present invention is not limited thereto and may include any type of programmable circuit.

The main memory 150 enables storing of various kinds of information and may comprise SDRAM or normal DRAM.

The network interface 160 enables communication mainly with the service processor 200 using a predetermined communication protocol.

The error detector 170 enables determining of whether any error has occurred in the boot up program, the control program, and configuration data stored in the flash memory to be the current system.

When update data is received from the service processor 200, the error detector 170 also notifies the microprocessor 120 that update data has been received.

The error detector 170 may use a fault recognition technique such as a timeout monitoring method as a technique to determine whether any error has occurred.

If, for example, after configuration data is incorporated into the FPGA 140, no response is received from the FPGA 140 within a predetermined period, the error detector 170 determines that an error has occurred in the configuration data and outputs content of an error to the service processor 200. In this case, information indicating that an error has occurred in the configuration data is output to the controller 230 of the service processor 200. Similarly, the error detector 170 also outputs content of an error when an error occurs in the boot up program or in a control program.

Processing when update data is received will be described below in detail.

When update data is received from the service processor 200, the error detector 170 notifies the microprocessor 120 that the data has been acquired and the notified microprocessor 120 determines the flash memory of the backup system from setting information stored in the flash memory 110c before writing an update data into the pertinent flash memory.

If the update data is update data for the boot up program, the microprocessor 120 updates the boot up program stored in the boot up program area and also updates control information in the control area.

If the update data is update data for a control program (firmware), the microprocessor 120 updates the control program stored in the control program area and also updates control information in the control area.

If the update data is update data for the configuration data, the microprocessor 120 updates the configuration data stored in the FPGA data area and also updates control information in the control area.

Then, after registration of update data with the flash memory of the backup system is completed, the microprocessor 120 changes setting information stored in the flash memory 110c and also resets the embedded system 100.

An update of setting information will be described more specifically. The microprocessor 120 turns on the current system flag and turns off the backup system flag of the flash memory, registration of update data of which is completed, and also turns off the current system flag and turns on the backup system flag of the flash memory that has been the current system.

The microprocessor 120 writes update data into the flash memory to be the backup system and changes setting information of the flash memory 110c, as described above, and therefore, when the embedded system 100 is rebooted, various processing can be performed based on update data from which causes of an error have been removed.

Next, processing of the embedded system 100 according to the present embodiment will be described.

Figure 4:
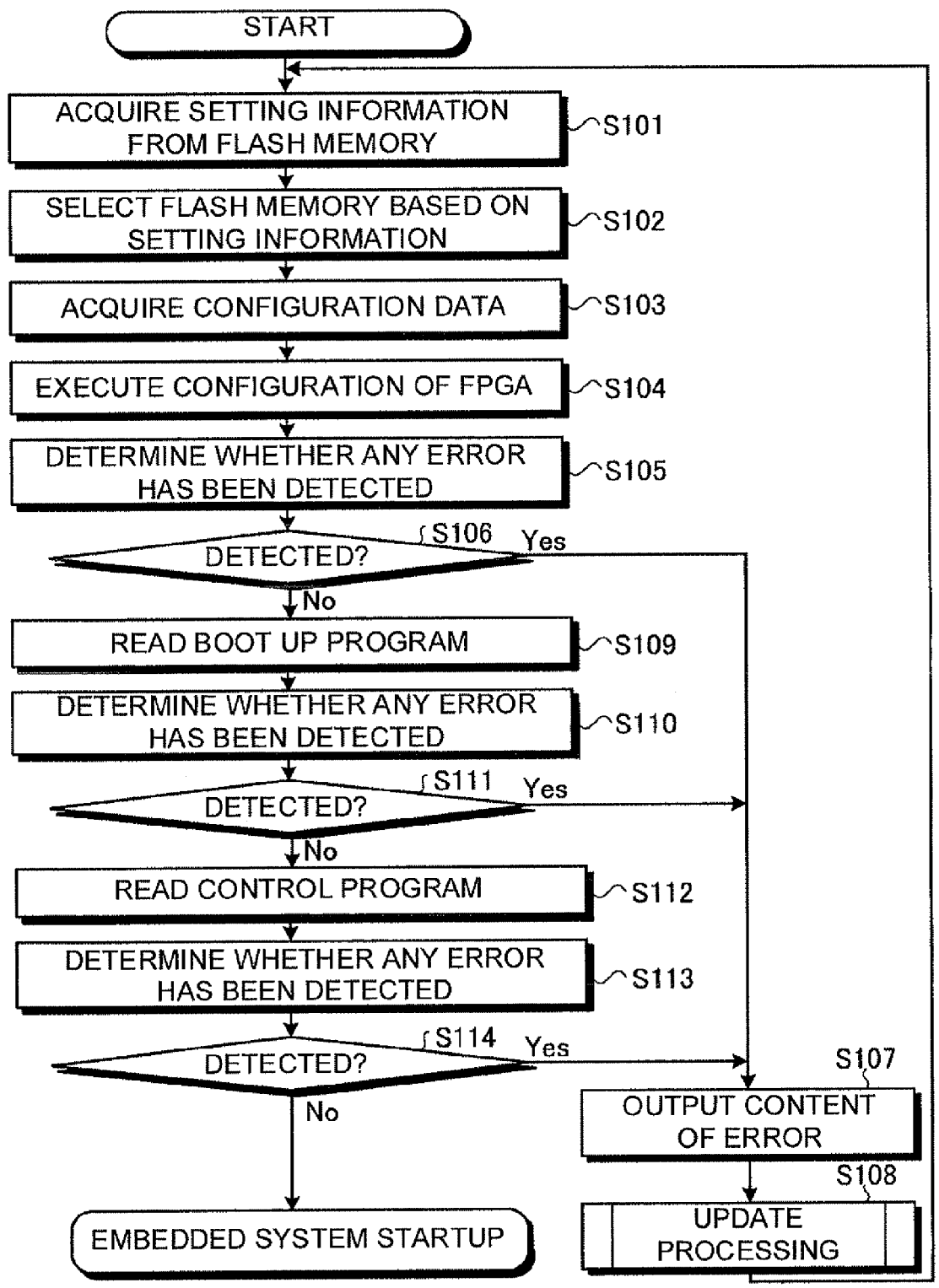
FIG. 4 is a flow chart illustrating a processing procedure for an embedded system.

FIG. 4 is a flow chart illustrating a processing procedure of the embedded system 100 according to the present embodiment.

As shown in FIG. 4, the flash memory switching controller 130 in the embedded system 100 acquires setting information from the flash memory 110c (operation S101) and selects the flash memory based on the setting information (operation S102).

Then, the FPGA 140 acquires configuration data (operation S103) and the FPGA 140 executes the configuration (operation S104) and the error detector 170 determines whether any error has been detected (operation S105).

If the error detector 170 detects an error (operation S106, Yes), the error detector 170 outputs content of the error to the service processor 200 (operation S107) and performs update processing (operation S108) before proceeding to operation S101.

If, the error detector 170 detects no error (operation S106, No), on the other hand, the boot up program is read from the flash memory (operation S109) to determine whether any error has occurred. (operation S110).

If the error detector 170 detects an error in the boot up program (operation S111, Yes), the process proceeds to operation S107.

If no error is detected by the error detector 170 (operation S111, No), on the other hand, the control program is read (operation S112) to determine whether any error has been detected (operation S113).

If the error detector 170 detects an error in the control program (operation S114, Yes), the process proceeds to operation S107.

If no error is detected by the error detector 170 (operation S114, No), on the other hand, the embedded system 100 is started up.

Update processing shown in operation S108 in FIG. 4 will be described below in further detail.

Figure 5:
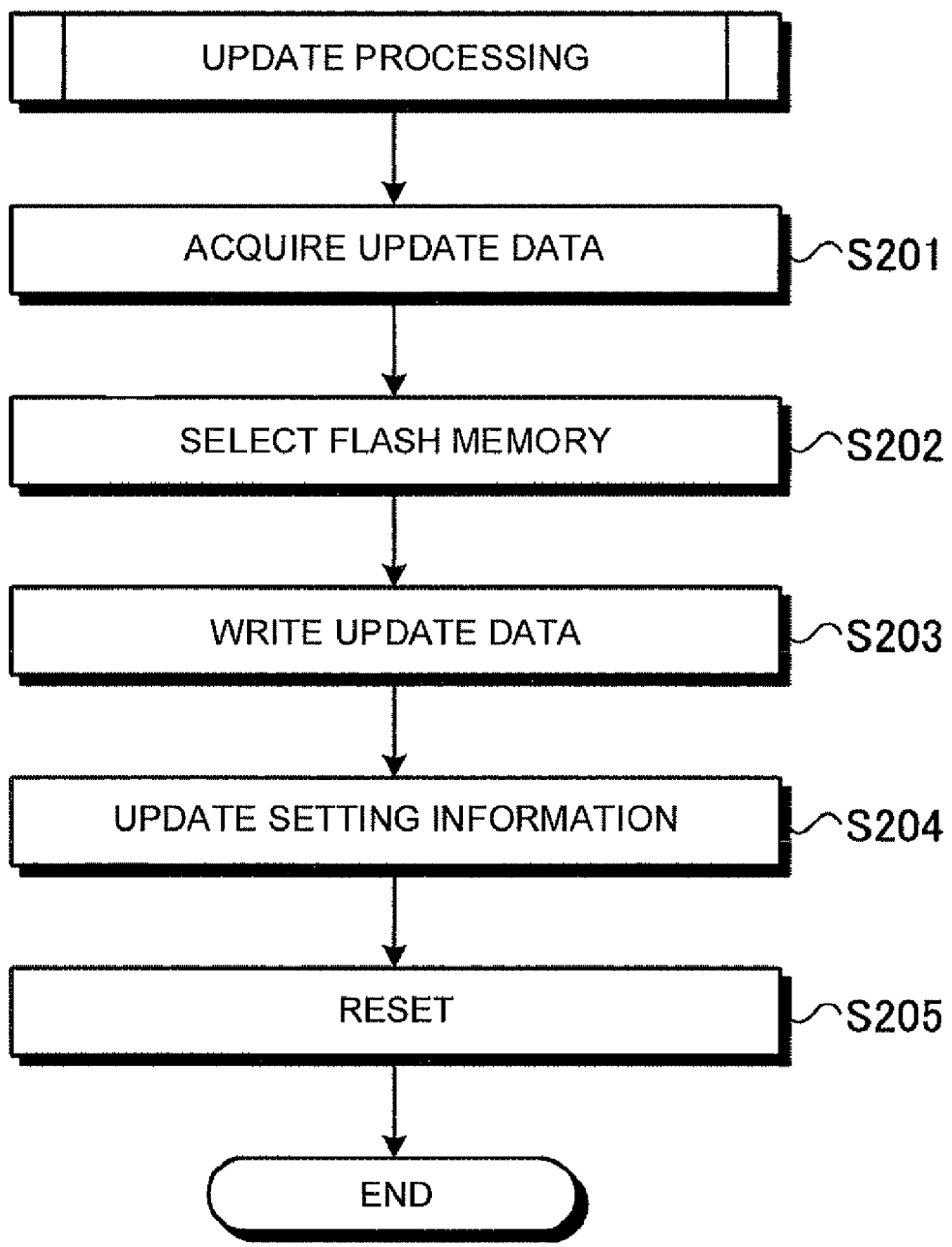
FIG. 5 is a flow chart illustrating a processing procedure for update processing.

FIG. 5 is a flow chart illustrating a processing procedure for update processing. As shown in FIG. 5, when the embedded system 100 acquires update data (operation S201), the microprocessor 120 acquires setting information stored in the flash memory 110c and selects the flash memory into which the update data should be written (operation S202).

Then, the microprocessor 120 writes the update data into the flash memory (operation S203), update setting information stored in the flash memory 110c (operation S204), and resets the embedded system 100 (operation S205).

The flash memory switching controller 130 selects the flash memory based on setting information stored in the flash memory 110c and starts up the embedded system 100 based on the boot up program, the control program, and the configuration data stored in the selected flash memory, as described above, and therefore, the boot up program, the control program, and the configuration data can efficiently be updated.

As has been described above, the embedded system 100 according to the present embodiment stores configuration data used for the programmable FPGA 140 and the boot up program and the control program used for startup of the embedded system 100 in the flash memories 110a and 110b and also stores setting information in the flash memory 110c.

Then, the flash memory switching controller 130 selects the flash memory based on setting information. In the example shown in FIG. 1, one of the flash memory 110a or the flash memory 110b will be selected.

Further, configuration data stored in the selected flash memory is incorporated into the FPGA 140 and also the boot up program and the control program stored in the flash memory are read to start up the embedded system 100.

Therefore, the disclosed embedded system 100 updates version numbers of the boot up program, the control program, and configuration data of the FPGA in an actual operation situation.

That is, even if an error occurs in the boot up program or hardware (FPGA) of the embedded system 100, a fixed program from the maintenance center server 300 can be applied without requiring replacing of hardware.

Also, the disclosed embedded system 100 writes update data into the flash memory of the backup system and therefore, the embedded system 100 can be maintained without requiring a customer system to be stopped, significantly reducing a maintenance time.

Further, since there is no need to return a printed circuit board of the embedded system 100 to the factory, cost, maintenance and work man-hours can significantly be reduced. When a printed circuit board of the embedded system is updated, the work time required for the update can also be reduced.

If the error detector 170 detects an error when starting up the embedded system 100, the service processor 200 is notified of content of the error and the microprocessor 120 acquires update data and stores the update data in the flash memory of the backup system for rebooting and therefore, countermeasures can efficiently be taken.

If an error occurs during operation after booting up the embedded system 100, the service processor 200 is notified of content of the error before update processing being performed. That is, if the error detector 170 of the disclosed embedded system 100 detects a bug in the boot up program, the control program, or FPGA data, the error detector 170 notifies the service processor 200 of content of the error.

Then, the error detector 170 records update data sent from the maintenance center server 300 in the flash memory of the backup system and changes setting information stored in the flash memory 110c.

That is, the error detector 170 switches ON or OFF settings of the current system flag and backup system flag of each flash memory.

Thereafter, the embedded system 100 is reset by the error detector 170 before performing processing corresponding to FIG. 4.

Error detection after the embedded system 100 has been started up may be carried out by a system administrator.

If an administrator detects an error such as a bug of the boot up program, the control program, or FPGA data in a factory or the like, the administrator stores an update program on the maintenance center server 300 to cause the flash memory of the backup system to store the update program and also causes the embedded system 100 to update setting information of the flash memory 110c before causing the embedded system 100 to perform processing corresponding to FIG. 4.

Moreover, since the embedded system 100 is started up by selecting an older program or an update program stored in each flash memory, if a new version cannot be started up due to an error, the system can immediately recover from the error by rebooting after switching back to the older program.

Incidentally, among processing described in the present embodiment, all or part of processing described to be automatically performed can also be performed manually, or all or part of processing described to be manually performed can also be performed.

Information including processing procedures, control procedures, names, various kinds of data and parameters shown in the above text and drawings, if not specifically mentioned, can optionally be changed.

Each component of the illustrated embedded system is a functionally conceptual and need not necessarily be physically constructed as illustrated. That is, concrete configurations of distribution/integration of each device are not limited to those illustrated and all or part thereof may be configured by functional or physical distribution/integration in any unit in accordance with various loads or usage.

Further, each processing function performed by each device may be realized totally or partially by a microprocessor and/or programs executed by the microprocessor or by hardware based on wired logic.

Figure 6:
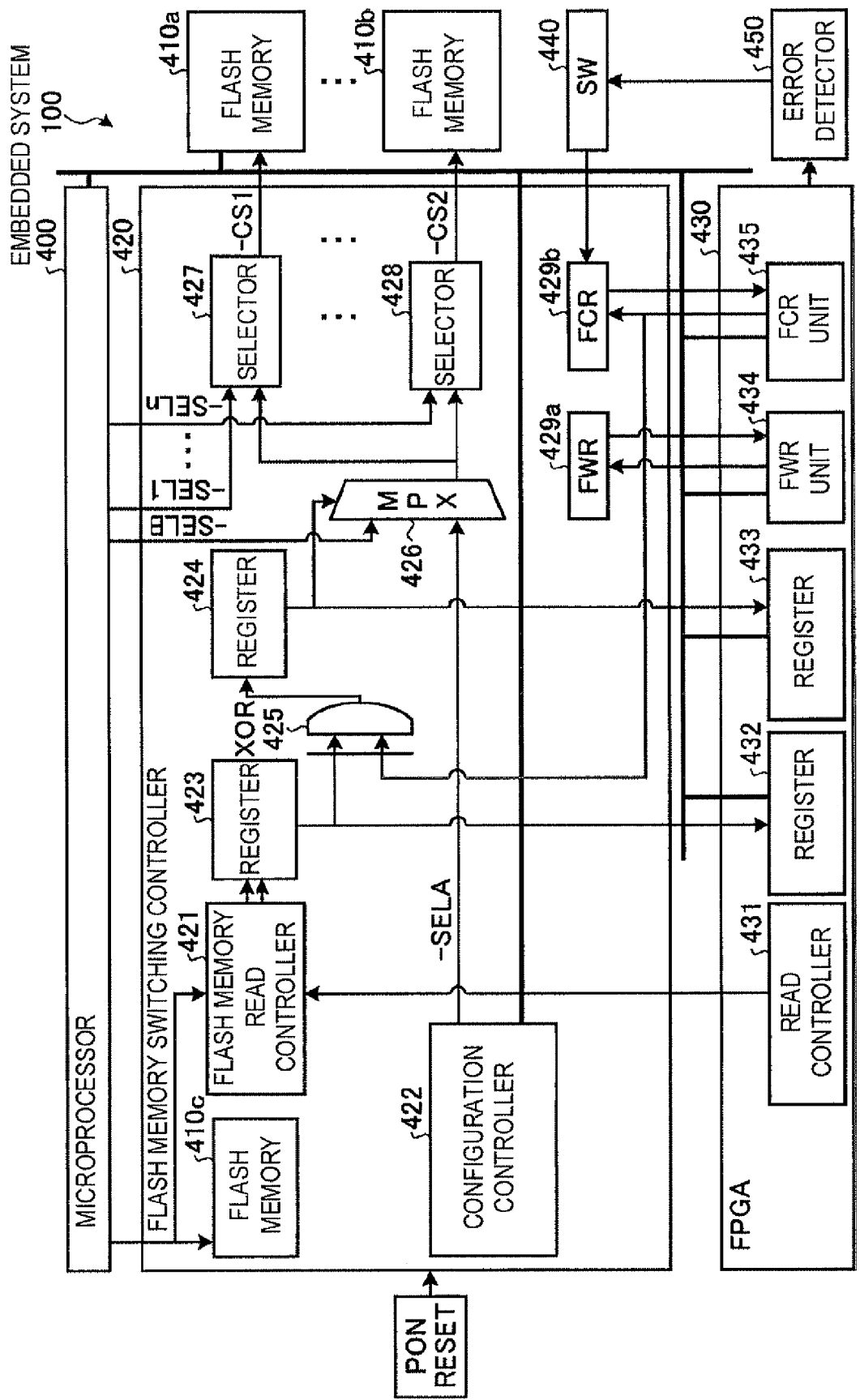
FIG. 6 is a functional block diagram illustrating a configuration of the embedded system shown in FIG. 1.
Figure 7:
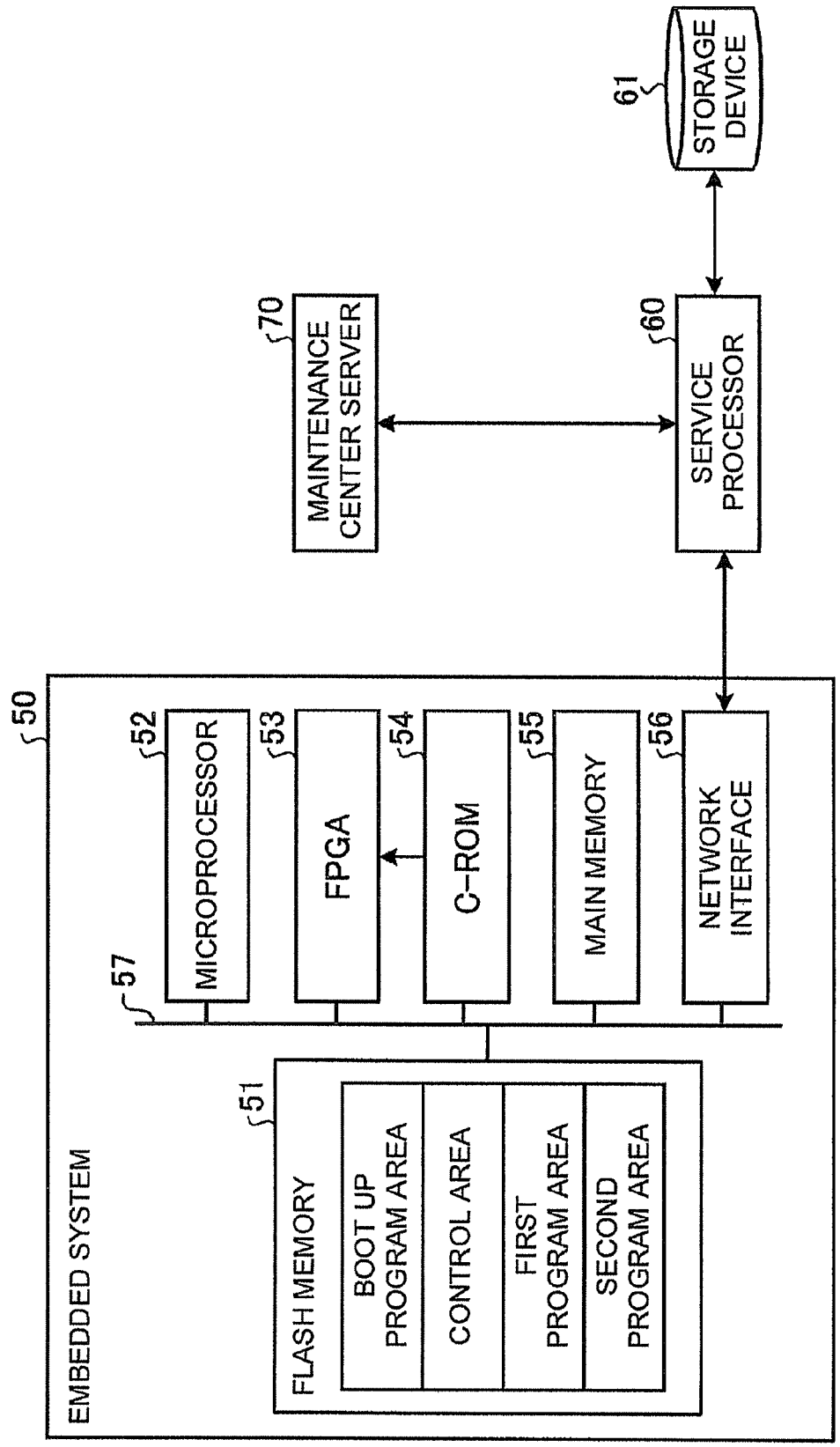
FIG. 7 is a schematic diagram for illustrating a firmware update system having a typical embedded system.
Figure 8:
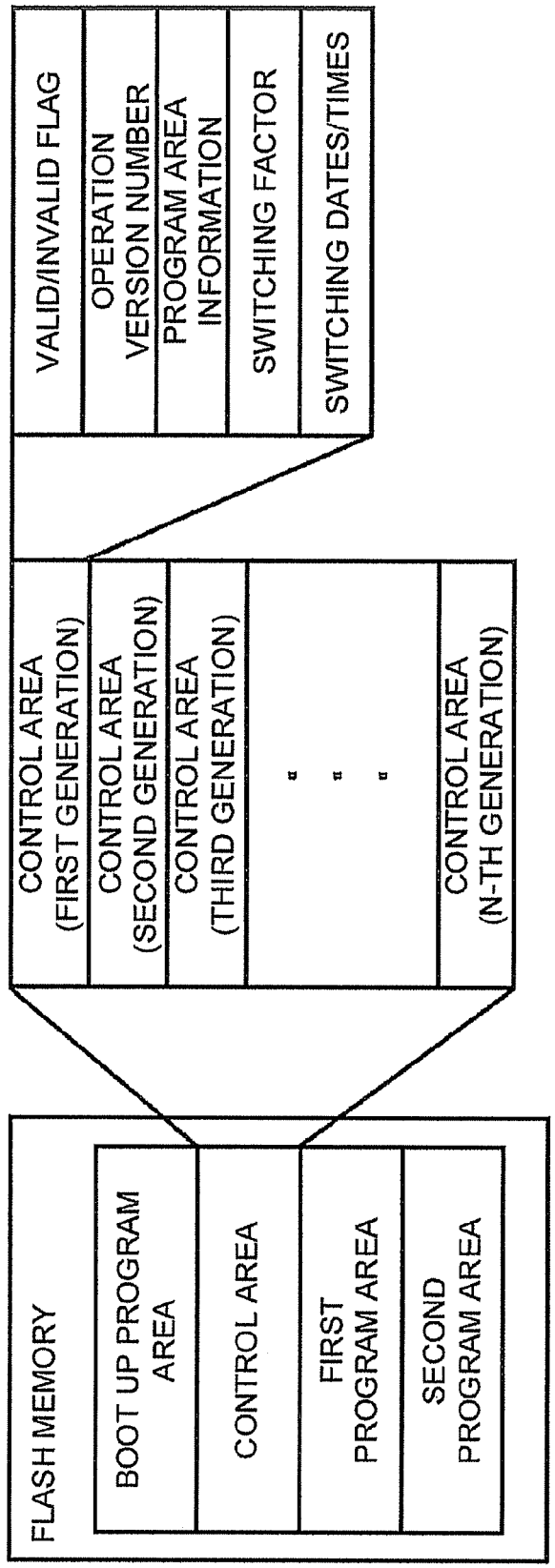
FIG. 8 is a diagram illustrating a data structure of a control area.

Here, a configuration of the embedded system 100 shown in FIG. 1 will be described. FIG. 6 is a functional block diagram illustrating configuration of the embedded system 100 shown in FIG. 1.

As shown in FIG. 6, the embedded system 100 comprises a microprocessor 400, flash memories 410a to 410c, a flash memory switching controller 420, an FPGA 430, an SW 440, and an error detector 450.

The microprocessor 400 corresponds to the microprocessor 120 shown in FIG. 1 and can read from/write into the flash memories 410a to 410c. The flash memories 410a to 410c correspond to the flash memories 110a to 110c shown in FIG. 1 respectively and the flash memories 410a and 410b store the boot up program, the control program, and configuration data of different version numbers.

The embedded system 100 is started up by content of the flash memory selected by a -CS1 signal or a -CS2 signal. Here, "CS" is an abbreviation of "Chip Select."

Incidentally, only flash memories of the flash memories 410a to 410c are illustrated, but the present invention is not limited to this and the embedded system 100 may be configured with other flash memories.

The flash memory switching controller 420 corresponds to the flash memory switching controller 130 shown in FIG. 1 and comprises a flash memory 410c, a flash memory read controller 421, a configuration controller 422, and logic circuit unit.

The logic circuit unit comprises registers 423 and 424, an XOR (exclusive OR) 425, a MPX (Multiplexer) 426, selectors 427 and 428, a FWR (Firmware Reset Flag) 429a and a FCR (Force Reset Flag) 429b.

The flash memory 410c stores data corresponding to setting information (See FIG. 3). The flash memory read controller 421 reads from the flash memory 410c during power-on, firmware reset, force reset, or when instructed from the microprocessor 400 and stores data read from the flash memory 410c in the register 423. The flash memory read controller 421 also reads from the flash memory 410c when instructed from a read controller 431 of the FPGA 430.

Here, the firmware reset is a reset performed by executing a reset routine of firmware and the force reset is a reset in which version number switching is forced and is also executable by hardware switching.

The configuration controller 422 configures the FPGA 430 based on configuration data stored in the flash memory selected by the logic circuit unit.

That is, the configuration controller 422 incorporates the configuration data into the FPGA 430.

Subsequently, turning to a description of the logic circuit unit, the register 423 is a register for storing data read from the flash memory 410c.

The register 424 is a register to store a value obtained after performing an exclusive-OR (XOR) operation of the register 423 and data stored in the FCR 429b during power-on, firmware reset, or force reset.

Data indicating the flash memory of the current system is stored in the register 424. The XOR 425 is a logic device for outputting a result of an exclusive-OR (XOR) operation of information recorded in the register 423 and information stored in the FCR 429b.

The FWR 429a is a register for storing data showing whether a firmware reset has been instructed by the microprocessor 400 executing firmware, and the FWR 429b is a register for storing data showing whether a force reset, which is a forced reset by hardware, has been instructed.

The FWR 429a and FWR 429b are registers that can be reset during power-on or from the microprocessor via a register inside the FPGA 430.

The MPX 426 is a logic circuit for configuring the FPGA 430 during power-on, firmware reset, or force reset and selecting the flash memory when booting up by firmware and rewriting update data.

The selectors 427 and 428 are selectors for selecting the flash memory based on instructions from the MPX 426.

The FPGA 430 corresponds to the FPGA 140 in FIG. 1 and comprises the read controller 431, registers 432 and 433, an FWR unit 434, and FCR unit 435.

The register 432 is a register that stores the same value as the register 423 and can be read from the microprocessor 400.

The register 433 is a register that stores the same value as the register 424 and can be read from the microprocessor 400.

The FWR unit 434 stores the same value as the FWR 429a and can clear the value of the FWR 429a from the microprocessor 400.

The FCR unit 435 stores the same value as the FCR 429b and can clear the value of the FWR 429b from the microprocessor 400.

The error detector 450 corresponds to the error detector 170 in FIG. 1 and turns of the SW (switch) 440 when an error in the FPGA 430 is detected (if no response is received within a predetermined period after incorporating configuration data).

If the SW 440 is turned on, information indicating that a force reset would be performed is stored in the FCR 429b.

Processing of the embedded system 100 illustrated in FIG. 1 will be described in detail below.

When power is turned on, the flash memory read controller 421 in the flash memory switching controller 420 operates and reads the value at address 0 of the flash memory 410c before storing the read value in the registers 423 and 424.

To start configuration of the FPGA 430, the configuration controller 422 asserts a -SELA signal.

The logic circuit unit determines the flash memory used for configuration of the FPGA 430 based on flash memory selection information indicated by the register 424.

After the configuration of the FPGA 430 is completed, the microprocessor 400 starts to operate, a -SELB signal becomes active, and the same flash memory as that used for configuration is selected by the logic circuit unit before starting booting up.

If, for example, "1" is stored in the register 424, the logic circuit unit selects the flash memory 410a and if "0" is stored in the register 424, the logic circuit unit selects the flash memory 410b.

If the boot up program, the control program, or configuration data is updated or corrected, the microprocessor 400 determines, based on the value of the register 424, the flash memory into which an update program should be written.

If, for example, the value of the register 424 is "1," the flash memory of the current system is the flash memory 410a and thus, the update program is written into the flash memory 410b of the backup system.

That is, the microprocessor 400 rewrites data of the flash memory 410b using a -SEL2 signal.

After the update data is successfully written, the microprocessor 400 writes a reversed value of the register 424 at address 0 of the flash memory 410c.

Then, after rebooting by a firmware reset, the flash memory read controller 421 of the flash memory switching controller 420 operates, reads the value at address 0 of the flash memory 410c, and stores the value "0" in the registers 423 and 424.

In ways described above, FPGA configuration by updated data and booting up of the microprocessor 400 are enabled.

If writing an update program should fail, data in the flash memory 410c is not rewritten and thus, the flash memory with the current version number can be used for startup.

If rewriting data in the flash memory 410c should fail, the flash memory with the current version number can also be used for startup.

If a force reset is executed, rebooting is executed by "1" indicating that the reset factor is a force reset being set to the FCR 429b of the flash memory switching controller 420.

If rebooting is executed, the flash memory read controller 421 operates and the flash memory read controller 421 reads the value at address 0 of the flash memory 410c and stores the value in the register 423.

An output of an exclusive-OR (XOR) operation of the register 423 and the FCR 429b by the XOR 425 becomes an input of the register 424 in the logic circuit unit.

Therefore, the value stored in the FCR 429b register is "1" during a force reset and thus, a reversed value of a value in the register 423 is stored in the register 424.

Accordingly, the flash memory that performs boot-up of the embedded system 100 including configuration and booting up is switched from the current system to the backup system.

After booting up is completed, since a reset factor is stored in the FCR unit 435 storing the same value as the FCR 429b, the microprocessor 400 determines that a force reset has been executed based on the value stored in the FCR unit 435.

Next, the microprocessor 400 rewrites the value at address 0 of the flash memory 410c to the value of the register 433 storing the same value as the register 424.

The flash memory 410c is also a non-volatile memory and thus, the value at address 0 of the flash memory 410c remains the same after power is turned on again.

The microprocessor 400 rewrites the value in the flash memory 410c so that the flash memory to be used during boot-up can be selected, as described above, and therefore, selection of the flash memory when power is turned on next time will never fail.

As has been described above, the disclosed embedded system and control method are useful for an embedded system in which a storage device is selected from a plurality of storage devices and the device is started up using data stored in the selected storage device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An embedded system, comprising:
    a programmable logic circuit;
    a plurality of storage devices each storing configuration data defining circuit information of the logic circuit;
    a setting information storage storing setting information including information indicating a storage device storing each configuration data; and
    a controller selecting one of the plurality of storage devices based on the setting information that corresponds to content of an error detected in the logic circuit and incorporating circuit information defined by configuration data stored in the storage device selected into the logic circuit.

2. The embedded system according to claim 1, wherein each of the plurality of storage devices stores a firmware for driving the embedded system, and
    the controller selects one of the plurality of storage devices based on the setting information and uses a firmware stored by the storage device selected for a boot-up operation.

3. The embedded system according to claim 1, wherein the setting information includes,
    identification information for identifying a current system storage device representing a storage device for storing a first configuration data defining circuit information incorporated in the logic circuit and a backup system storage device representing a backup system storage device for storing a second configuration data different from the first configuration data, and
    the embedded system includes:
        a data update device updating the second configuration data based on the identification information when a third configuration data different from the first configuration data and the second configuration data is acquired, by replacing the second configuration data with the third configuration data.

4. The embedded system according to claim 3, wherein the data update device updates firmware stored in the backup system storage device based on the identification information when the updated firmware is acquired, by replacing the firmware stored in the backup system storage device with the updated firmware.

5. The embedded system according to claim 1, comprising:
    an error detector determining whether another error has occurred in the logic circuit; and
    wherein the setting information is updated based on a determination result of the error detector.

6. The embedded system according to claim 5, wherein the error detector determines whether an error has occurred in a firmware and outputs a corresponding determination result of the embedded system.

7. A control method of an embedded system having a programmable logic circuit and a plurality of storage devices for storing configuration data defining circuit information of the logic circuit, comprising:
    storing setting information including information indicating a storage device storing the configuration data in a setting information storage unit;
    selecting one of the plurality of storage devices based on the setting information that corresponds to content of an error detected in the logic circuit; and
    incorporating circuit information defined by configuration data stored in the storage device selected into the logic circuit.

8. The control method according to claim 7, comprising:
    storing a firmware driving the embedded system in the plurality of storage devices, wherein one of the plurality of storage devices is selected based on the setting information and a firmware stored in the storage device selected is used for a boot-up operation.

9. The control method according to claim 7, wherein the setting information includes,
    identification information for identifying a current system storage device representing a storage device for storing a first configuration data defining circuit information incorporated in the logic circuit and a backup system storage device representing a backup system storage device for storing a second configuration data different from the first configuration data and
    the control method includes:
        updating the second configuration data based on the identification information when a third configuration data different from the first configuration data and the second configuration data is acquired, by replacing the second configuration data with the third configuration data.

10. The control method according to claim 9, wherein the updating the configuration data includes updating a firmware stored in the backup system storage device based on the identification information when the updated firmware is acquired, by replacing the firmware stored in the backup system storage device with the updated firmware.

11. The control method according to claim 7, comprising:
    determining whether another error has occurred in the logic circuit; and
    updating the setting information based on a determination result of the determining.

12. The control method according to claim 11, wherein the determining whether an error has occurred determines whether an error has occurred in a firmware and outputs a corresponding determination result of the embedded system.

* * * * *